United States Patent
Yuan et al.

(10) Patent No.: US 10,139,968 B2
(45) Date of Patent: Nov. 27, 2018

(54) TOUCH SENSING CIRCUIT OF CAPACITIVE TOUCH PANEL

(71) Applicant: Raydium Semiconductor Corporation, Hsinchu (TW)

(72) Inventors: Chih Yuan, New Taipei (TW); Yu Kuang, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 505 days.

(21) Appl. No.: 14/919,882

(22) Filed: Oct. 22, 2015

(65) Prior Publication Data
US 2016/0117021 A1    Apr. 28, 2016

(30) Foreign Application Priority Data

Oct. 23, 2014    (TW) .............................. 103136712 A (51) Int. Cl.
*G06F 3/044*    (2006.01)
*G06F 3/041*    (2006.01)

(52) U.S. Cl.
CPC ............ *G06F 3/044* (2013.01); *G06F 3/0418* (2013.01)

(58) Field of Classification Search
CPC .............................. G06F 3/044; G06F 3/0418
See application file for complete search history.

(56) References Cited

U.S. PATENT DOCUMENTS

| | | | |
|---|---|---|---|
| 9,092,086 B2* | 7/2015 | Krah ........................ | G06F 3/041 |
| 2013/0162586 A1* | 6/2013 | Erdogan ............... | G06F 3/0416 |
| | | | 345/174 |
| 2014/0125625 A1* | 5/2014 | Su .......................... | G06F 3/044 |
| | | | 345/174 |

\* cited by examiner

*Primary Examiner* — Amare Mengistu
*Assistant Examiner* — Jennifer Zubajlo (57) ABSTRACT

A touch sensing circuit includes N periodic-wave signal generation modules, an analog front-end circuit module, N mixing modules, and N integration modules. N is an integer. The N periodic-wave signal generation modules generate N first periodic-wave signals having N frequencies to N first channels of a capacitive touch panel. The analog front-end circuit module receives and demodulates the N first periodic-wave signals passing through N mutual capacitance at N intersection points of the N first channels and a second channel to output an analog front-end signal. The N mixing modules mix the analog front-end signal and N second periodic-wave signals having the N frequencies respectively into N mixed signals. The N integration modules integrate the N mixed signals to generate N output signals.

13 Claims, 4 Drawing Sheets

TOUCH SENSING CIRCUIT OF CAPACITIVE TOUCH PANEL

BACKGROUND OF THE INVENTION

Field of the Invention

This invention relates to a capacitive touch panel, especially to a touch sensing circuit of the capacitive touch panel.

Description of the Related Art

Figure 1:
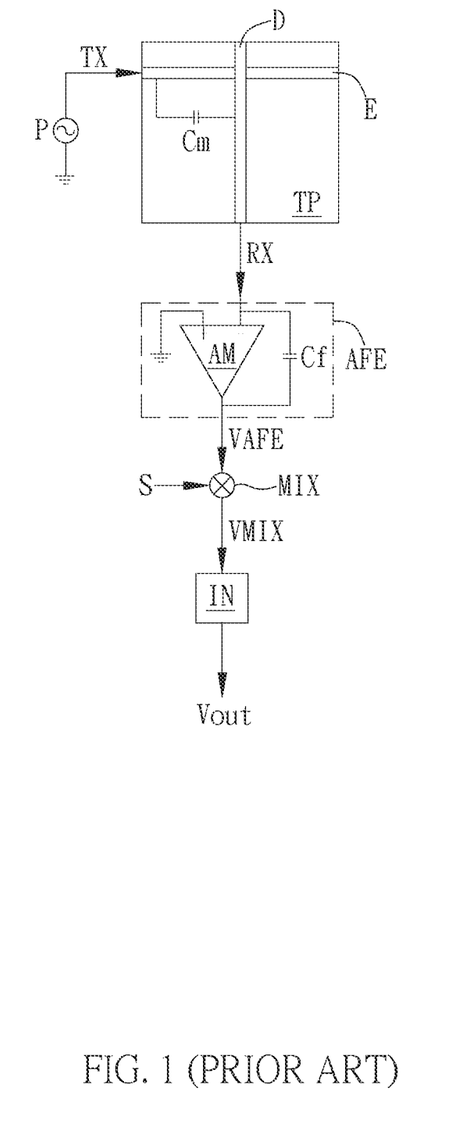
FIG. 1 illustrates a schematic diagram of the touch sensing circuit of the conventional capacitive touch panel.

Please refer to FIG. 1. FIG. 1 illustrates a schematic diagram of the conventional touch sensing circuit of a capacitive touch panel. Since the capacitive touch panel TP is easily interfered by display panel and power, as shown in FIG. 1, the input signal generator P inputs a sine-wave input signal TX having a frequency $nf_0$ to a horizontal electrode E of the capacitive touch panel TP. A time function TX(t) of the sine-wave input signal TX can be expressed as:

$$TX(t) = -Vref * \sin(2\pi nf_0 t) \quad (1)$$

Wherein, Vref is a reference voltage; $nf_0$ is the frequency of the sine-wave input signal TX; t is time.

Then, the sine-wave input signal TX is received and amplified by the parasitic mutual capacitance Cm at intersection points of horizontal electrodes E and vertical electrodes D of the capacitive touch panel TP and the analog front-end circuit AFE, and then outputted to the mixer circuit MIX.

Wherein, the time function VAFE(t) of the sine-wave voltage signal VAFE outputted by the analog front-end circuit AFE can be expressed as:

$$VAFE(t) = Vref * \sin(2\pi nf_0 t) * \frac{Cm}{Cf} \quad (2)$$

Then, the mixer circuit MIX will mix the sine-wave voltage signal VAFE outputted by the analog front-end circuit AFE and another sine-wave S having the same frequency $nf_0$ into a mixed signal VMIX and output the mixed signal VMIX to the integrator circuit IN.

Wherein, the time function VMIX(t) of the mixed signal VMIX outputted by the mixer circuit MIX can be expressed as:

$$\begin{aligned} VMIX(t) &= Vref * \sin(2\pi nf_0 t) * \frac{Cm}{Cf} * \sin(2\pi nf_0 t) \\ &= Vref * \frac{Cm}{Cf} * \sin(2\pi nf_0 t)\sin(2\pi nf_0 t) \\ &= Vref * \frac{Cm}{Cf} * \frac{1-\cos(2*2\pi nf_0 t)}{2} \end{aligned} \quad (3)$$

When the integrator circuit IN receives the mixed signal VMIX outputted by the mixer circuit MIX, the integrator circuit IN will integrate the mixed signal VMIX into an output signal Vout. If the integration cycle used by the integrator circuit IN to integrate the mixed signal VMIX is $1/nf_0$, then the time function Vout(t) of the output signal Vout generated by the integrator circuit IN can be expressed as:

$$\begin{aligned} Vout(t) &= \int_0^{1/nf_0} Vref * \frac{Cm}{Cf} * \left(\frac{1-\cos(2*2\pi nf_0 t)}{2}\right) dt \quad (4) \\ &= \frac{Vref}{nf_0} * \frac{Cm}{2Cf} + Vref * \frac{Cm}{Cf} * \left(\int_0^{1/nf_0} \left(\frac{-\cos(2*2\pi nf_0 t)}{2}\right) dt\right) \\ &= \frac{Vref}{nf_0} * \frac{Cm}{2Cf} + Vref * \frac{Cm}{Cf} * \left(\frac{-\sin(2*2\pi nf_0(1/nf_0))}{2*2*2\pi nf_0}\right) \\ &= \frac{Vref}{nf_0} * \frac{Cm}{2Cf} + Vref * \frac{Cm}{Cf} * \left(\frac{-\sin(2*2\pi)}{2*2*2\pi nf_0}\right) \\ &= \frac{Vref}{nf_0} * \frac{Cm}{2Cf} \end{aligned}$$

From the equation (4), it can be found that the output signal Vout generated by the integrator circuit IN is a DC voltage without any AC voltage. Therefore, it is easy for the analog-to-digital converting circuit ADC to convert the output signal Vout into digital values, so that touch point determination will become simpler. In addition, since the value of the output signal Vout is proportional to the parasitic mutual capacitance Cm at the intersection point of horizontal electrodes E and vertical electrodes D of the capacitive touch panel TP, the value of output signal Vout can be used to determine whether the intersection point of horizontal electrodes E and vertical electrodes D of the capacitive touch panel TP is touched or not.

With this capacitive touch sensing structure, the noises having a frequency N times of $nf_0$ (N>1) can be totally filtered, and other noises can be also reduced accordingly. However, the drawback of the prior art is that, in order to filter the noises having lower frequencies, smaller frequency $nf_0$ will be used and the integration cycle $1/nf_0$ used by the integration circuit IN will become longer; therefore, the capacitive touch sensing efficiency will become poor, even the frame report rate of the capacitive touch panel will fail to meet the product specification.

Therefore, the invention provides a touch sensing circuit of a capacitive touch panel to solve the above-mentioned problems.

SUMMARY OF THE INVENTION

A preferred embodiment of the invention is a touch sensing circuit. In this embodiment, the touch sensing circuit is applied to a capacitive touch panel. The capacitive touch panel includes a plurality of first channels arranged along a first direction and a plurality of second channels arranged along a second direction. The plurality of first channels and the plurality of second channels cross each other.

The touch sensing circuit includes N periodic-wave signal generation modules, an analog front-end circuit module, N mixing modules, and N integration modules. The N periodic-wave signal generation modules are coupled to N first channels of the plurality of first channels respectively. The N periodic-wave signal generation modules generate N first periodic-wave signals having N frequencies to N first channels respectively, wherein N is an integer. The analog front-end circuit module is coupled to the plurality of second channels. The analog front-end circuit module receives the N first periodic-wave signals passing through N mutual capacitance at N intersection points of the N first channels and a second channel of the plurality of second channels from the second channel and demodulates the N first periodic-wave signals to output an analog front-end signal.

The N mixing modules are coupled to the analog front-end circuit module respectively. The N mixing modules receive the analog front-end signal from the analog front-end circuit module respectively and receive N second periodic-wave signals having the N frequencies respectively, and then mix the analog front-end signal and the N second periodic-wave signals respectively into N mixed signals. The N integration modules are coupled to the N mixing modules respectively. The N integration modules receive the N mixed signals respectively and integrate the N mixed signals respectively to generate N output signals.

In an embodiment, the N frequencies have a common divisor frequency.

In an embodiment, an integration time used by the N integration modules to integrate the N mixed signals respectively is a reciprocal of the common divisor frequency or a multiple of the reciprocal of the common divisor frequency.

In an embodiment, the N first periodic-wave signals having the N frequencies are sine waves, cosine waves, square waves, ramp waves, or triangle waves.

In an embodiment, the N second periodic-wave signals having the N frequencies are sine waves, cosine waves, square waves, ramp waves, or triangle waves.

In an embodiment, a periodic-wave signal generation module of the N periodic-wave signal generation modules is coupled to a first channel of the N first channels, the periodic-wave signal generation module generates a first periodic-wave signal of the N first periodic-wave signals to the first channel, and the first periodic-wave signal has a frequency of the N frequencies.

In an embodiment, a mixing module of the N mixing modules receives the analog front-end signal from the analog front-end circuit module and receives a second periodic-wave signal of the N second periodic-wave signals, and then the mixing module mixes second periodic-wave signal and the second periodic-wave signal into a mixed signal of the N mixed signals, and the second periodic-wave signal has a frequency of the N frequencies.

In an embodiment, an integration module of the N integration modules is coupled to the mixing module and the integration module receives the mixed signal from the mixing module and integrates the mixed signal to generate an output signal of the N output signals.

In an embodiment, the mixing module and the integration module include N equal capacitors, N first switches, N second switches, and a buffer circuit, each of the N capacitors has one terminal coupled to ground and another terminal coupled to between a first switch of the N first switches and a second switch of the N second switches, the N first switches are coupled to the analog front-end circuit module, the N second switches are coupled to an input terminal of the buffer circuit, the N first switches are conducted in order under control of N first control signals respectively to sample the analog front-end signal with a sampling frequency; after an integration time, N sampled voltages are sampled and stored in the N capacitors respectively, the N second switches are conducted at the same time under control of a second control signal, the N sampled voltages stored in the N capacitors share their charges to each other to generate the output signal having an average voltage and an output terminal of the buffer circuit outputs the output signal.

In an embodiment, the N frequencies have a common divisor frequency and the sampling frequency is N times of the common divisor frequency.

In an embodiment, the mixing module and the integration module include N equal capacitors, N first switches, N second switches, N third switches, a fourth switch, and an operational amplifier circuit, each of the N capacitors has one terminal coupled to a negative input terminal of the operational amplifier circuit and another terminal coupled to a first switch of the N first switches, a second switch of the N second switches, and a third switch of the N third switches, the N first switches are coupled to the analog front-end circuit module, the N second switches are coupled to an output terminal of the operational amplifier circuit, the N third switches and a positive input terminal of the operational amplifier circuit are coupled to ground, two terminals of the fourth switch are coupled to the negative input terminal and the output terminal of the operational amplifier circuit respectively.

In an embodiment, the N third switches are conducted to ground under control of a first control signal and the fourth switch is conducted under control of a second control signal to redistribute charges; then, the N third switches are disconnected under control of the first control signal and the fourth switch is still conducted under control of the second control signal, the N first switches are conducted in order under control of N third control signals to sample the analog front-end signal with a sampling frequency; after an integration time, N sampled voltages are sampled and stored in the N capacitors respectively, the fourth switch is disconnected under control of the second control signal, the N second switches are conducted to an output terminal of the operational amplifier circuit under control of a fourth control signal, the N sampled voltages stored in the N capacitors share their charges to each other to generate the output signal having an average voltage and the output terminal of the operational amplifier circuit outputs the output signal.

In an embodiment, the N frequencies have a common divisor frequency and the sampling frequency is N times of the common divisor frequency.

Compared to the prior art, the touch sensing circuit of the capacitive touch panel in this invention has the following advantages:

(1) The touch sensing circuit of the capacitive touch panel in this invention can increase the integration cycle used by the integrator circuit without decreasing the frame report rate of the capacitive touch panel;

(2) The touch sensing circuit of the capacitive touch panel in this invention can filter the noises having lower frequencies without decreasing the frame report rate of the capacitive touch panel to reduce the effects of the noises on touch sensing of the capacitive touch panel;

(3) The touch sensing circuit of the capacitive touch panel in this invention can demodulate a plurality of input periodic-wave signal in a plurality of horizontal channels of the capacitive touch panel at the same time through multiple sets of mixer circuits and integration circuits respectively and further sense the touch points according to the changes of the mutual capacitance between the plurality of horizontal channels and vertical channels of the capacitive touch panel.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In order to solve the problems in the prior arts, the touch sensing circuit of the capacitive touch panel of the invention uses N first input signals having different frequencies to drive N horizontal electrodes on the capacitive touch panel at the same time, and the frequencies of the N first input signals are different integer multiples of the frequency f0.

After the N first periodic-wave signals having different frequencies pass through N mutual capacitance at N intersection points of the N horizontal electrodes and the N vertical electrodes on the capacitive touch panel respectively, the N first periodic-wave signals are outputted to the analog front-end circuit and added by the analog front-end circuit to form a voltage signal. Then, the analog front-end circuit outputs the voltage signal to N mixer circuits respectively.

The N mixer circuits will mix the voltage signal outputted by the analog front-end circuit and N second input signals having different frequencies into N mixed signals respectively and then output the N mixed signals into N integrator circuits respectively. It should be noticed that the frequencies of the N second input signals are the same with the frequencies of the N first input signals.

When the N integrator circuits receive the N mixed signals respectively, the N integrator circuits will use an integration cycle 1/f0 to integrate the N mixed signals respectively to obtain N output signals having DC value. The voltage values of the N output signal is proportional to the N parasitic mutual capacitances at the N intersection points of the N horizontal electrodes and the N vertical electrodes. Therefore, the N parasitic mutual capacitances at the N intersection points can be detected at the same time.

With that, the touch sensing circuit of the capacitive touch panel of the invention can increase the integration cycle used by the integrator circuit to filter the noises having lower frequencies under the condition that the frame report rate of the capacitive touch panel is maintained. Therefore, the capacitive touch sensing efficiency of the capacitive touch panel can be enhanced and the effects caused by the noises to the touch sensing of the capacitive touch panel can be reduced.

Then, the following different embodiments are used to introduce the touch sensing circuit of the capacitive touch panel of the invention in detail.

A preferred embodiment of the invention is a touch sensing circuit. In this embodiment, the touch sensing circuit is applied to a capacitive touch panel, but not limited to this. The capacitive touch panel includes a plurality of first channels (horizontal channels) and a plurality of second channels (vertical channels). The plurality of first channels is arranged along a first direction (horizontal direction) and the plurality of second channels is arranged along a second direction (vertical direction). The plurality of first channels and the plurality of second channels are interlaced each other.

Figure 2:
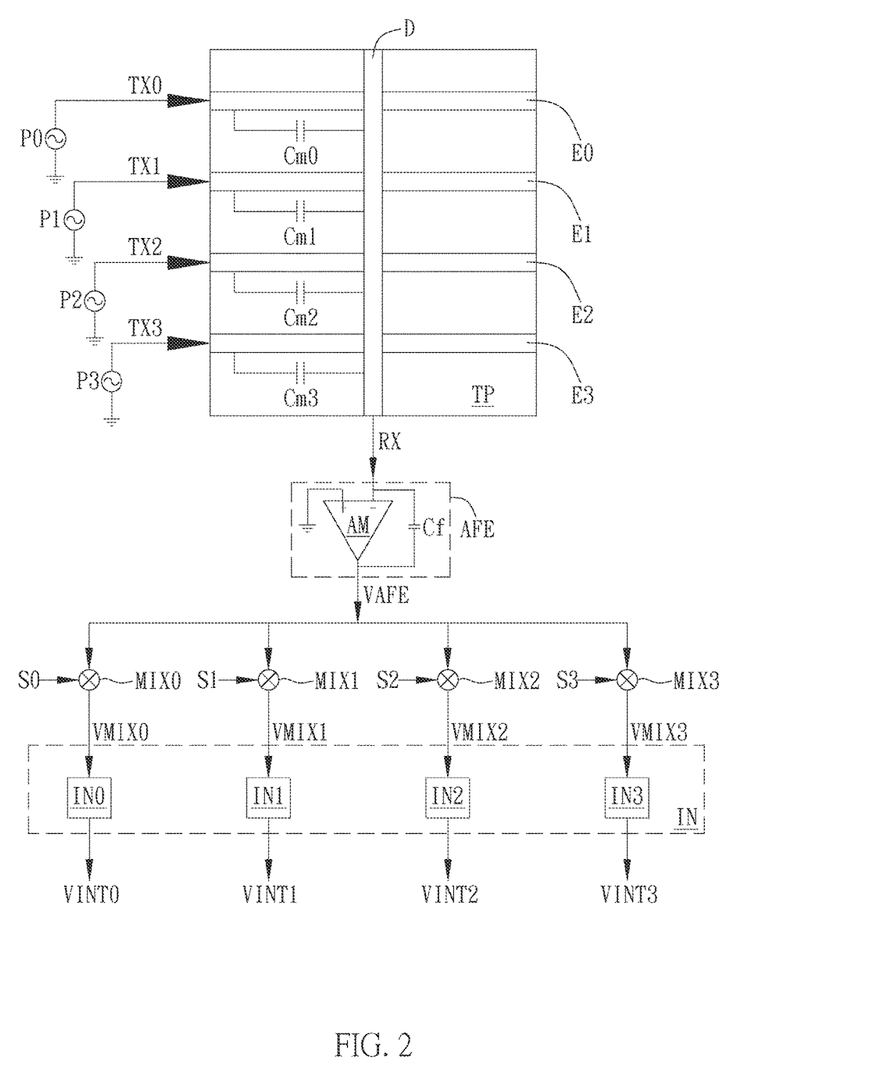
FIG. 2 illustrates a schematic diagram of the touch sensing circuit of the capacitive touch panel in a preferred embodiment of this invention.

As shown in FIG. 2, the capacitive touch panel TP includes first channels E0~E3 arranged along the horizontal direction and a second channel D arranged along the vertical direction. It should be noticed that only one second channel D is shown in FIG. 2 and other second channels are omitted for convenience of explanation. In fact, the number of the first channels and second channels can be determined based practical needs without specific limitations.

In this embodiment, the touch sensing circuit of FIG. 2 includes 4 periodic-wave signal generation modules P0~P3, an analog front-end circuit module AFE, 4 mixing modules MIX0~MIX3, and 4 integration modules IN0~IN3. Wherein, the periodic-wave signal generation modules P0~P3 are disposed at the input terminal of the capacitive touch panel TP; the analog front-end circuit module AFE, the mixing modules MIX0~MIX3, and the integration modules IN0~IN3 are disposed at the output terminal of the capacitive touch panel TP. The integration modules IN0~IN3 can be also integrated into an integrator IN.

The periodic-wave signal generation modules P0~P3 are coupled to the first channels E0~E3 of the capacitive touch panel TP respectively. The periodic-wave signal generation modules P0~P3 generate first periodic-wave signals TX0~TX3 having different frequencies which are different integer multiples of the frequency f0 respectively and output the first periodic-wave signals TX0~TX3 into the first channels E0~E3 of the capacitive touch panel TP respectively.

In fact, the first periodic-wave signals TX0~TX3 can be sine waves, cosine waves, square waves, ramp waves, or triangle waves. For example, if the first periodic-wave signals TX0~TX3 are sine waves having different frequencies which are different integer multiples of the frequency f0 respectively, wherein the frequency of the first periodic-wave signal TX0 inputted to the first channel E0 is Nf0; the frequency of the first periodic-wave signal TX1 inputted to the first channel E1 is (N+1)f0; the frequency of the first periodic-wave signal TX2 inputted to the first channel E2 is (N+2)f0; the frequency of the first periodic-wave signal TX3 inputted to the first channel E3 is (N+3)f0. The time functions TX0($t$)~TX3($t$) of the first periodic-wave signals TX0~TX3 are expressed as follows:

$$TX0(t) = -Vref^* \sin(2\pi N f_0 t) \quad (5)$$

$$TX1(t) = -Vref^* \sin(2\pi (N+1) f_0 t) \quad (6)$$

$$TX2(t) = -Vref^* \sin(2\pi (N+2) f_0 t) \quad (7)$$

$$TX3(t) = -Vref^* \sin(2\pi (N+3) f_0 t) \quad (8)$$

The analog front-end circuit module AFE is coupled to the second channel D of the capacitive touch panel TP and used to receive the first periodic-wave signals TX0~TX3 passing through 4 parasitic mutual capacitances Cm0~Cm3 at 4 intersection points of the first channels E0~E3 and the second channel D and demodulate the first periodic-wave signals TX0~TX3 respectively, and then the analog front-end circuit module AFE generates an analog front-end signal VAFE according to the first periodic-wave signals TX0~TX3 and outputs the analog front-end signal VAFE. In this embodiment, the analog front-end circuit module AFE includes an operational amplifier AM and a capacitor Cf. The positive input terminal + of the operational amplifier AM is coupled to ground and the negative input terminal − of the operational amplifier AM is coupled to the second channel D. One terminal of the capacitor Cf is coupled to the negative input terminal − of the operational amplifier AM and another terminal of the capacitor Cf is coupled to the output terminal of the operational amplifier AM. The time function VAFE(t) of the analog front-end signal VAFE is expressed as follows:

$$VAFE(t) = \frac{Vref}{Cf} * \begin{pmatrix} Cm0 \cdot \sin(2\pi N f_0 t) + Cm1 \cdot \sin(2\pi(N+1)f_0 t) + \\ Cm2 \cdot \sin(2\pi(N+2)f_0 t) + Cm3 \cdot \sin(2\pi(N+3)f_0 t) \end{pmatrix} \quad (9)$$

The mixing modules MIX0~MIX3 are coupled to the analog front-end circuit module AFE respectively. The mixing modules MIX0~MIX3 receive the analog front-end signal VAFE from the analog front-end circuit module AFE periodic-wave signal S2 inputted into the mixing module MIX2 is $(N+2)f_0$; the frequency of the second periodic-wave signal S3 inputted into the mixing module MIX3 is $(N+3)f_0$.

Taking the mixing module MIX0 for example, after the mixing module MIX0 receives the analog front-end signal VAFE from the analog front-end circuit module AFE and receives the second periodic-wave signal S0 having a frequency of $Nf_0$, the mixing module MIX0 will mix the analog front-end signal VAFE and the second periodic-wave signal S0 to generate a mixed signal VMIX0. The time function S0(t) of the second periodic-wave signal S0 can be expressed as follows:

$$S0(t) \cong \sin(2\pi N f_0 t) + \frac{1}{3}\sin(3 * 2\pi N f_0 t) + \frac{1}{5}\sin(5 * 2\pi N f_0 t) \quad (10)$$

As to the time function VMIX0(t) of the mixed signal VMIX0 can be expressed as follows:

$$VMIX0(t) \cong \frac{Vref}{Cf} * (Cm0 * \sin(2\pi * N * f_0 t) + Cm1 * \sin(2\pi(N+1)f_0 t) + Cm2 * \sin(2\pi(N+2)f_0 t) + Cm3 * \sin(2\pi(N+3)f_0 t)) * \quad (11)$$

$$\left( \sin(2\pi * N * f_0 t) + \frac{1}{3}\sin(3 * 2\pi * N * f_0 t) + \frac{1}{5}\sin(5 * 2\pi * N * f_0 t) \right)$$

$$= \frac{Vref}{Cf} * \begin{pmatrix} Cm0 * \begin{pmatrix} \sin(2\pi * N * f_0 t)\sin(2\pi * N * f_0 t) + \\ \sin(2\pi * N * f_0 t)\frac{1}{3}\sin(3 * 2\pi * N * f_0 t) + \\ \sin(2\pi * N * f_0 t)\frac{1}{5}\sin(5 * 2\pi * N * f_0 t) \end{pmatrix} + Cm1 * \begin{pmatrix} \sin(2\pi(N+1)f_0 t)\sin(2\pi * N * f_0 t) + \\ \sin(2\pi(N+1)f_0 t)\frac{1}{3}\sin(3 * 2\pi * N * f_0 t) + \\ \sin(2\pi(N+1)f_0 t)\frac{1}{5}\sin(5 * 2\pi * N * f_0 t) \end{pmatrix} + \\ Cm2 * \begin{pmatrix} \sin(2\pi(N+2)f_0 t)\sin(2\pi * N * f_0 t) + \\ \sin(2\pi(N+2)f_0 t)\frac{1}{3}\sin(3 * 2\pi * N * f_0 t) + \\ \sin(2\pi(N+2)f_0 t)\frac{1}{5}\sin(5 * 2\pi * N * f_0 t) \end{pmatrix} + Cm3 * \begin{pmatrix} \sin(2\pi(N+3)f_0 t)\sin(2\pi * N * f_0 t) + \\ \sin(2\pi(N+3)f_0 t)\frac{1}{3}\sin(3 * 2\pi * N * f_0 t) + \\ \sin(2\pi(N+3)f_0 t)\frac{1}{5}\sin(5 * 2\pi * N * f_0 t) \end{pmatrix} \end{pmatrix}$$

$$= \frac{Vref}{Cf} * \begin{pmatrix} Cm0 * \begin{pmatrix} \frac{1-\cos(2\pi(2N)f_0 t)}{2} + \frac{\cos(2\pi(2N)f_0 t) - \cos(2\pi(4N)f_0 t)}{3*2} + \\ \frac{\cos(2\pi(4N)f_0 t) - \cos(2\pi(6N)f_0 t)}{5*2} \end{pmatrix} + \\ Cm1 * \begin{pmatrix} \frac{\cos(2\pi * f_0 t) - \cos(2\pi(2N+1)f_0 t)}{2} + \\ \frac{\cos(2\pi(2N-1)f_0 t) - \cos(2\pi(4N+1)f_0 t)}{3*2} + \\ \frac{\cos(2\pi(4N-1)f_0 t) - \cos(2\pi(6N+1)f_0 t)}{5*2} \end{pmatrix} + Cm2 * \begin{pmatrix} \frac{\cos(2*2\pi * f_0 t) - \cos(2\pi(2N+2)f_0 t)}{2} + \\ \frac{\cos(2\pi(2N-2)f_0 t) - \cos(2\pi(4N+2)f_0 t)}{3*2} + \\ \frac{\cos(2\pi(4N-2)f_0 t) - \cos(2\pi(6N+2)f_0 t)}{5*2} \end{pmatrix} + \\ Cm3 * \begin{pmatrix} \frac{\cos(3*2\pi * f_0 t) - \cos(2\pi(2N+3)f_0 t)}{2} + \frac{\cos(2\pi(2N-3)f_0 t) - \cos(2\pi(4N+3)f_0 t)}{3*2} + \\ \frac{\cos(2\pi(4N-3)f_0 t) - \cos(2\pi(6N+3)f_0 t)}{5*2} \end{pmatrix} \end{pmatrix}$$

respectively and receive 4 second periodic-wave signals S0~S3 having different frequencies respectively, and then the mixing modules MIX0~MIX3 mix the analog front-end signal VAFE with the second periodic-wave signals S0~S3 to generate 4 mixed signals VMIX0~VMIX3 respectively.

It should be noticed that the frequencies of the second periodic-wave signals S0~S3 correspond to the frequencies of the first periodic-wave signals TX0~TX3. In this embodiment, the second periodic-wave signals S0~S3 are square waves having different frequencies which are different integer multiples of the frequency $f_0$ respectively, wherein the frequency of the second periodic-wave signal S0 inputted into the mixing module MIX0 is $Nf_0$; the frequency of the second periodic-wave signal S1 inputted into the mixing module MIX1 is $(N+1)f_0$; the frequency of the second As to the time functions S1(t)~S3(t) of the second periodic-wave signals S1~S3 and the time functions VMIX1(t)~VMIX3(t) of the mixed signals VMIX1~VMIX3 can be expressed in similar way.

As shown in FIG. 2, the integration modules IN0~IN3 are coupled to the mixing modules MIX0~MIX3 respectively, wherein the integration module IN0 is coupled to the mixing module MIX0; the integration module IN1 is coupled to the mixing module MIX1; the integration module IN2 is coupled to the mixing module MIX2; the integration module IN3 is coupled to the mixing module MIX3. The integration modules IN0~IN3 receive the mixed signals VMIX1~VMIX3 from the mixing modules MIX0~MIX3 respectively and use the integration cycle $1/f_0$ to integrate the mixed signals VMIX0~VMIX3 respectively to generate output signals VINT0~VINT3 having DC value.

Taking the integration module IN0 for example, the time function VINT0($t$) of the output signal VINT0 generated by the integration module IN0 can be expressed as follows:

$$VINT0(t) \cong \int_0^{1/f_0} \frac{Vref}{Cf} * VMIX0(t)dt \qquad (12)$$

Adding equation (11) into equation (12) as follows:

$$VINT0(t) = \frac{Vref}{f_0} * \frac{Cm0}{2Cf} \qquad (13)$$

Since the integration cycle of the integration module IN0 is $1/f_0$, it can be found from the equation (13) that the time function VINT0($t$) of the output signal VINT0 generated by the integration module IN0 only keeps the integration value of the signal having the same frequency $nf_0$ with the time function S0($t$) of the second periodic-wave signal S0 in equation (10). After the integration is done, the signals having frequencies which are integer multiples of $f_0$ will disappear. From equation (13), it can be found that the time function VINT0($t$) of the output signal VINT0 outputted by the integration module IN0 is proportional to the parasitic mutual capacitance Cm0 at the intersection point of the first channel E0 and the second channel D.

Similarly, the time function VINT1($t$) of the output signal VINT1 outputted by the integration module IN1 is proportional to the parasitic mutual capacitance Cm1 at the intersection point of the first channel E1 and the second channel D; the time function VINT2($t$) of the output signal VINT2 outputted by the integration module IN2 is proportional to the parasitic mutual capacitance Cm2 at the intersection point of the first channel E2 and the second channel D; the time function VINT3($t$) of the output signal VINT3 outputted by the integration module IN3 is proportional to the parasitic mutual capacitance Cm3 at the intersection point of the first channel E3 and the second channel D.

That is to say, since the output signal VINT0~VINT3 outputted by the integration modules IN0~IN3 of the touch sensing circuit of the invention has a fixed proportional relationship with the parasitic mutual capacitances Cm0~Cm3 at the intersection points of the first channels E0~E3 and the second channel D respectively, the touch sensing circuit of the invention can be used to detect the capacitance changes on the capacitive touch panel TP to obtain the information of the touch points.

In addition, since four periodic-wave signals having different frequencies are inputted to drive four different horizontal channels on the capacitive touch panel at the same time and the demodulation is done by four sets of fixing modules and integration modules respectively in this embodiment, touch signals of four touch points can be demodulated at the same time and its touch sensing speed can be four time of that in the prior art which only drives one horizontal channel on the capacitive touch panel at the same time. Even the touch sensing speed is fixed in this embodiment and the prior art, this embodiment can increase the time length of the integration cycle of the integration module to filter the noises having lower frequencies.

It should be noticed that although the first periodic-wave signals TX0~TX3 are sine waves and the second periodic-wave signals S0~S3 are square waves in the above-mentioned embodiments, the first periodic-wave signals TX0~TX3 actually can be cosine waves, square waves, ramp waves, or triangle waves and the second periodic-wave signals S0~S3 actually can be cosine waves, sine waves, ramp waves, or triangle waves, but not limited to this.

In addition, the number of periodic-wave signals used to drive the horizontal channels on the capacitive touch panel and the number of the sets of mixing modules and integration modules can be determined based on practical needs. However, the number of the sets of mixing modules and integration modules should be larger than or equal to the number of the frequency types of the periodic-wave signals used to drive the horizontal channels on the capacitive touch panel. For example, if the periodic-wave signals having two different frequencies are used to drive the horizontal channels on the capacitive touch panel, at least 2 sets of mixing modules and integration modules are necessary.

Figure 3:
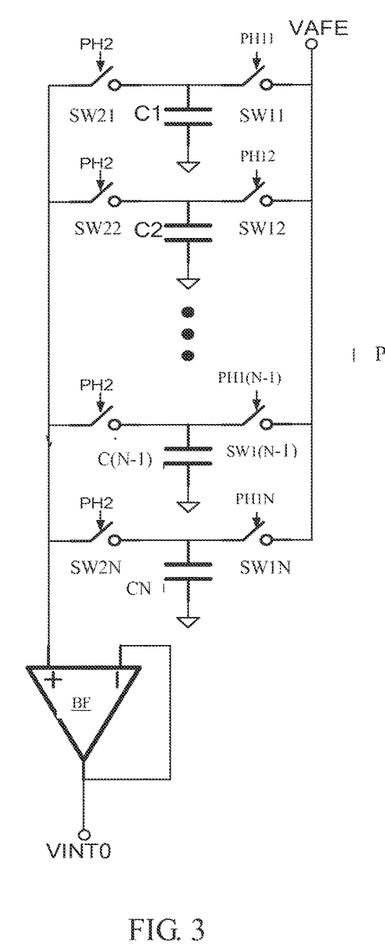
FIG. 3 illustrates an embodiment of the first set of mixing module MIX0 and integration module IN0 of FIG. 2.
Figure 4:
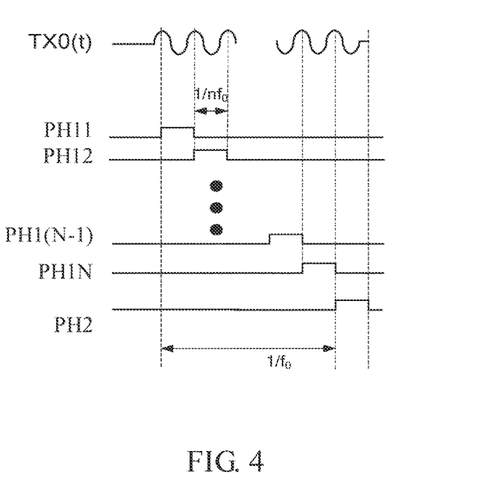
FIG. 4 illustrates waveform timing diagrams of the first periodic-wave signal TX0 and the control signals of FIG. 3.

Please refer to FIG. 3 and FIG. 4. FIG. 3 illustrates an embodiment of the first set of mixing module MIX0 and integration module IN0 of FIG. 2; FIG. 4 illustrates waveform timing diagrams of the first periodic-wave signal TX0 and the control signals of FIG. 3.

As shown in FIG. 3, the first set of mixing module MIX0 and integration module IN0 include N equal capacitors C1~CN, N first switches SW11~SW1N, N second switches SW21~SW2N, and a buffer circuit BF. The capacitor C1 of the N capacitors C1~CN has one terminal coupled to ground and another terminal coupled to between a first switch SW11 of the N first switches SW11~SW1N and a second switch SW21 of the N second switches SW21~SW2N, and so on. The N first switches SW11~SW1N are coupled to the analog front-end circuit module AFE. The N second switches SW21~SW2N are coupled to an input terminal of the buffer circuit BF. The N first switches SW11~SW1N are conducted in order under control of N first control signals PH11~PH1N respectively to sample the analog front-end signal VAFE with a sampling frequency $Nf_0$ (namely N times of the common divisor frequency $f_0$); after an integration time $1/f_0$ (namely a reciprocal of the common divisor frequency $f_0$), N sampled voltages are sampled and stored in the N capacitors C1~CN respectively. Then, the N second switches SW21~SW2N are conducted at the same time under control of a second control signal PH2, the N sampled voltages stored in the N capacitors C1~CN share their charges to each other to generate the output signal VINT0 having an average voltage and an output terminal of the buffer circuit BF outputs the output signal VINT0.

Figure 5:
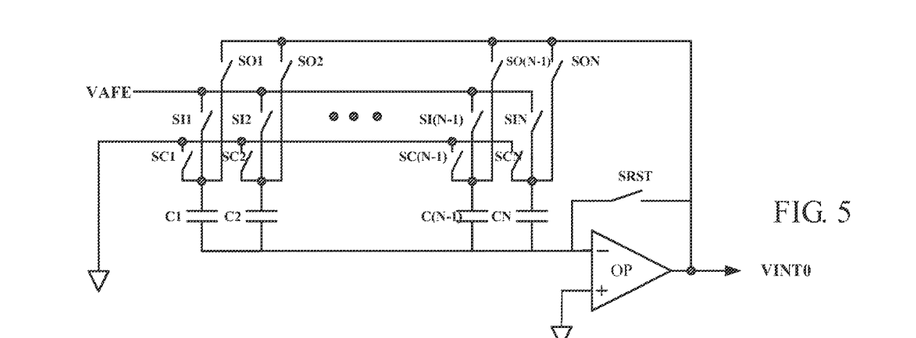
FIG. 5 illustrates another embodiment of the first set of mixing module MIX0 and integration module IN0 of FIG. 2.
Figure 6:
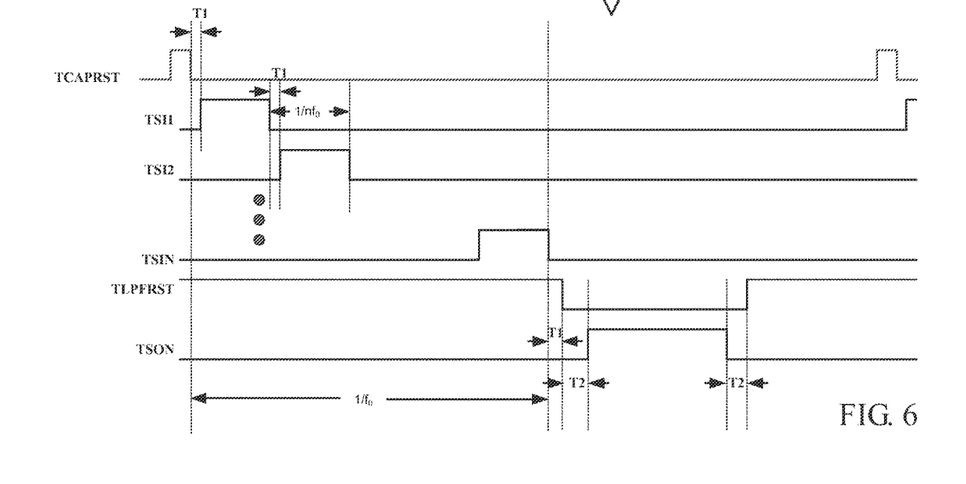
FIG. 6 illustrates waveform timing diagrams of the control signals of FIG. 5.

Please refer to FIG. 5 and FIG. 6. FIG. 5 illustrates another embodiment of the first set of mixing module MIX0 and integration module IN0 of FIG. 2; FIG. 6 illustrates waveform timing diagrams of the control signals of FIG. 5.

As shown in FIG. 5, the first set of mixing module MIX0 and the integration module IN0 include N equal capacitors C1~CN, N first switches SI1~SIN, N second switches SO1~SON, N third switches SC1~SCN, a fourth switch SRST, and an operational amplifier circuit OP. Wherein, each of the N capacitors C1~CN has one terminal coupled to a negative input terminal − of the operational amplifier circuit OP and another terminal coupled to a first switch of the N first switches SI1~SIN, a second switch of the N second switches SO1~SON, and a third switch of the N third switches SC1~SCN. The N first switches SI1~SIN are coupled to the analog front-end circuit module AFE. The N second switches SO1~SON are coupled to an output terminal of the operational amplifier circuit OP. The N third switches SC1~SON and a positive input terminal + of the operational amplifier circuit OP are coupled to ground. Two terminals of the fourth switch SRST are coupled to the negative input terminal − and the output terminal of the operational amplifier circuit respectively.

The N third switches SC1~SCN are conducted to ground under control of a first control signal TCAPRST and the fourth switch SRST is conducted under control of a second control signal TLPFRST to redistribute charges; then, the N third switches SC1~SCN are disconnected under control of the first control signal TCAPRST and the fourth switch SRST is still conducted under control of the second control signal TLPFRST, the N first switches SI1~SIN are conducted in order under control of the N first switch control signals TSI1~TSIN to sample the analog front-end signal VAFE with a sampling frequency $Nf_0$ (namely N times of the common divisor frequency $f_0$); after an integration time $1/f_0$ (namely a reciprocal of the common divisor frequency $f_0$), N sampled voltages are sampled and stored in the N capacitors C1~CN respectively. Afterward, the fourth switch SRST is disconnected under control of the second control signal TLPFRST, and the N second switches SO1~SON are conducted to an output terminal of the operational amplifier circuit OP under control of a third control signal TSON, so that the N sampled voltages stored in the N capacitors C1~CN can share their charges to each other to generate the output signal VINT0 having an average voltage and the output terminal of the operational amplifier circuit OP will output the output signal VINT0.

It should be noticed that FIG. 3 and FIG. 5 only illustrate different embodiments of the first set of mixing module MIX0 and integration module IN0 of the touch sensing circuit of the invention respectively. As to other sets of mixing module and integration module, such as the second set of mixing module MIX1 and integration module IN1 or the third set of mixing module MIX2 and integration module IN2 can be also realized through the same circuits, but not limited to this.

Compared to the prior art, the touch sensing circuit of the capacitive touch panel in this invention has the following advantages:

(1) The touch sensing circuit of the capacitive touch panel in this invention can increase the integration cycle used by the integrator circuit without decreasing the frame report rate of the capacitive touch panel;

(2) The touch sensing circuit of the capacitive touch panel in this invention can filter the noises having lower frequencies without decreasing the frame report rate of the capacitive touch panel to reduce the effects of the noises on touch sensing of the capacitive touch panel;

(3) The touch sensing circuit of the capacitive touch panel in this invention can demodulate a plurality of input periodic-wave signal in a plurality of horizontal channels of the capacitive touch panel at the same time through multiple sets of mixer circuits and integration circuits respectively and further sense the touch points according to the changes of the mutual capacitance between the plurality of horizontal channels and vertical channels of the capacitive touch panel.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A touch sensing circuit applied to a capacitive touch panel, the capacitive touch panel comprising a plurality of first channels arranged along a first direction and a plurality of second channels arranged along a second direction, the plurality of first channels and the plurality of second channels crossing each other, the touch sensing circuit comprising:

N periodic-wave signal generation modules coupled to N first channels of the plurality of first channels respectively, the N periodic-wave signal generation modules being configured to generate N first periodic-wave signals having N frequencies to N first channels respectively, wherein N is an integer;

an analog front-end circuit module, coupled to the plurality of second channels, the analog front-end circuit module being configured to receive the N first periodic-wave signals passing through N mutual capacitance at N intersection points of the N first channels and a second channel of the plurality of second channels from the second channel and demodulating the N first periodic-wave signals to output an analog front-end signal;

N mixing modules, coupled to the analog front-end circuit module respectively, the N mixing modules being configured to receive the analog front-end signal from the analog front-end circuit module respectively and receiving N second periodic-wave signals having the N frequencies respectively, and then mixing the analog front-end signal and the N second periodic-wave signals respectively into N mixed signals; and N integration modules, coupled to the N mixing modules respectively, the N integration modules being configured to receive the N mixed signals respectively and integrating the N mixed signals respectively to generate N output signals;

wherein formulas for the N first periodic-wave signals $TX0(t)$ and $TX1(t)$ are $TX0(t)=-Vref*\sin(2\pi Nf_0 t)$ and $TX1(t)=-Vref*\sin(2\pi(N+1)f_0 t)$;

a formula for the analog front-end signal VAFE(t) is $$VAFE(t) = \frac{Vref}{Cf} * (Cm0 \cdot \sin(2\pi N f_0 t) + Cm1 \cdot \sin(2\pi(N+1)f_0 t) +$$
$$Cm2 \cdot \sin(2\pi(N+2)f_0 t) + Cm3 \cdot \sin(2\pi(N+3)f_0 t));$$

a formula for the N second periodic-wave signals $S0(t)$ is $S0(t) \cong \sin(2\pi Nf_0 t) + \frac{1}{3}\sin(3*2\pi Nf_0 t) + \frac{1}{5}\sin(5*2\pi Nf_0 t)$;

a formula for the N mixed signals $VMIX0(t)$ is $$VMIX0(t) \cong \frac{Vref}{Cf} * (Cm0 * \sin(2\pi * N * f_0 t) + Cm1 * \sin(2\pi(N+1)f_0 t) +$$
$$Cm2 * \sin(2\pi(N+2)f_0 t) + Cm3 * \sin(2\pi(N+3)f_0 t)) *$$
$$\left(\sin(2\pi * N * f_0 t) + \frac{1}{3}\sin(3*2\pi * N * f_0 t) + \frac{1}{5}\sin(5*2\pi * N * f_0 t)\right);$$

and a formula for the N output signals $VINT0(t)$ is $$VINT0(t) = \frac{Vref}{f_0} * \frac{Cm0}{2Cf}$$

2. The touch sensing circuit of claim 1, wherein the N frequencies have a common divisor frequency.

3. The touch sensing circuit of claim 2, wherein an integration time used by the N integration modules to integrate the N mixed signals respectively is a reciprocal of the common divisor frequency or a multiple of the reciprocal of the common divisor frequency.

4. The touch sensing circuit of claim 1, wherein the N first periodic-wave signals having the N frequencies are sine waves, cosine waves, square waves, ramp waves, or triangle waves.

5. The touch sensing circuit of claim 1, wherein the N second periodic-wave signals having the N frequencies are sine waves, cosine waves, square waves, ramp waves, or triangle waves.

6. The touch sensing circuit of claim 1, wherein a periodic-wave signal generation module of the N periodic-wave signal generation modules is coupled to a first channel of the N first channels, the periodic-wave signal generation module generates a first periodic-wave signal of the N first periodic-wave signals to the first channel, and the first periodic-wave signal has a frequency of the N frequencies.

7. The touch sensing circuit of claim 1, wherein a mixing module of the N mixing modules receives the analog front-end signal from the analog front-end circuit module and receives a second periodic-wave signal of the N second periodic-wave signals, and then the mixing module mixes second periodic-wave signal and the second periodic-wave signal into a mixed signal of the N mixed signals, and the second periodic-wave signal has a frequency of the N frequencies.

8. The touch sensing circuit of claim 7, wherein an integration module of the N integration modules is coupled to the mixing module and the integration module receives the mixed signal from the mixing module and integrates the mixed signal to generate an output signal of the N output signals.

9. The touch sensing circuit of claim 8, wherein the mixing module and the integration module comprise N equal capacitors, N first switches, N second switches, and a buffer circuit, each of the N capacitors has one terminal coupled to ground and another terminal coupled to between a first switch of the N first switches and a second switch of the N second switches, the N first switches are coupled to the analog front-end circuit module, the N second switches are coupled to an input terminal of the buffer circuit, the N first switches are conducted in order under control of N first control signals respectively to sample the analog front-end signal with a sampling frequency; after an integration time, N sampled voltages are sampled and stored in the N capacitors respectively, the N second switches are conducted at the same time under control of a second control signal, the N sampled voltages stored in the N capacitors share their charges to each other to generate the output signal having an average voltage and an output terminal of the buffer circuit outputs the output signal.

10. The touch sensing circuit of claim 9, wherein the N frequencies have a common divisor frequency and the sampling frequency is N times of the common divisor frequency.

11. The touch sensing circuit of claim 8, wherein the mixing module and the integration module comprise N equal capacitors, N first switches, N second switches, N third switches, a fourth switch, and an operational amplifier circuit, each of the N capacitors has one terminal coupled to a negative input terminal of the operational amplifier circuit and another terminal coupled to a first switch of the N first switches, a second switch of the N second switches, and a third switch of the N third switches, the N first switches are coupled to the analog front-end circuit module, the N second switches are coupled to an output terminal of the operational amplifier circuit, the N third switches and a positive input terminal of the operational amplifier circuit are coupled to ground, two terminals of the fourth switch are coupled to the negative input terminal and the output terminal of the operational amplifier circuit respectively.

12. The touch sensing circuit of claim 11, wherein the N third switches are conducted to ground under control of a first control signal and the fourth switch is conducted under control of a second control signal to redistribute charges; then, the N third switches are disconnected under control of the first control signal and the fourth switch is still conducted under control of the second control signal, the N first switches are conducted in order under control of N third control signals to sample the analog front-end signal with a sampling frequency; after an integration time, N sampled voltages are sampled and stored in the N capacitors respectively, the fourth switch is disconnected under control of the second control signal, the N second switches are conducted to an output terminal of the operational amplifier circuit under control of a fourth control signal, the N sampled voltages stored in the N capacitors share their charges to each other to generate the output signal having an average voltage and the output terminal of the operational amplifier circuit outputs the output signal.

13. The touch sensing circuit of claim 12, wherein the N frequencies have a common divisor frequency and the sampling frequency is N times of the common divisor frequency.

* * * * *